United States Patent
AlDarwish et al.

(10) Patent No.: US 12,168,507 B2
(45) Date of Patent: Dec. 17, 2024

(54) AIRCRAFT STRUCTURE AND ASSOCIATED TOOLS AND METHODS

(71) Applicant: Ahmad Fareed AlDarwish, Dubai (AE)

(72) Inventors: Ahmad Fareed AlDarwish, Dubai (AE); Saeed Kayyani, Sharja (AE)

(73) Assignee: Ahmad AlDarwish, Dubai (AE)

( * ) Notice: Subject to any disclaimer, the term of this patent is extended or adjusted under 35 U.S.C. 154(b) by 81 days.

(21) Appl. No.: 17/997,496

(22) PCT Filed: Mar. 31, 2021

(86) PCT No.: PCT/IB2021/052712
§ 371 (c)(1),
(2) Date: Oct. 28, 2022

(87) PCT Pub. No.: WO2021/198964
PCT Pub. Date: Oct. 7, 2021

(65) Prior Publication Data
US 2023/0174221 A1    Jun. 8, 2023

Related U.S. Application Data

(60) Provisional application No. 63/004,178, filed on Apr. 2, 2020.

(51) Int. Cl.
*B64C 21/02* (2006.01)
*B64C 1/00* (2006.01)
*B64F 5/00* (2017.01)

(52) U.S. Cl.
CPC ............ *B64C 21/02* (2013.01); *B64C 1/0009* (2013.01); *B64F 5/00* (2013.01)

(58) Field of Classification Search
CPC ............. B64F 5/00; B64C 21/02; B64C 3/36
See application file for complete search history.

(56) References Cited

U.S. PATENT DOCUMENTS 3,051,413 A * 8/1962 Pouit ..................... B64C 23/005
                                                                244/12.5
3,161,377 A * 12/1964 Balluff .................. B64C 21/025
                                                                244/12.5

(Continued)

FOREIGN PATENT DOCUMENTS

| EP | 3258334 A1 | 12/2017 |
| KR | 10-2013-0013466 A | 2/2013 |
| WO | 2013/108999 A1 | 7/2013 |

OTHER PUBLICATIONS

How It Works: A Wiffle Ball Pitch | Popular Science, Technology, How It Works: A Wiffle Ball Pitch, Take a whiff of that, Apr. 7, 2014, 9 pages, https://www.popsci.com/article/technology/how-it-works-wiffle-ball-pitch/.

(Continued)

*Primary Examiner* — Tye William Abell
(74) *Attorney, Agent, or Firm* — TraskBritt

(57) ABSTRACT

An aircraft including a fuselage with one or more wings extending from the fuselage. The aircraft may include one or more apertures in a surface of at least one of the fuselage and the one or more wings. The one or more apertures may be configured to enable air to pass through the one or more apertures when the aircraft is flying.

16 Claims, 11 Drawing Sheets

(56) References Cited

U.S. PATENT DOCUMENTS

| | | | | |
|---|---|---|---|---|
| 4,382,569 A * | 5/1983 | Boppe | ................... | B64C 23/065 244/199.4 |
| 2005/0121555 A1* | 6/2005 | Morgenstern | ............. | B64F 5/00 244/130 |
| 2015/0183521 A1* | 7/2015 | Ohnishi | ................ | B64D 33/10 244/17.11 |

OTHER PUBLICATIONS

International Search Report for International Application No. PCT/IB2021/052712, mailed Jul. 9, 2013, 3 pages.
International Written Opinion for International Application No. PCT/IB2021/052712, mailed Jul. 9, 2021, 5 pages.

* cited by examiner

AIRCRAFT STRUCTURE AND ASSOCIATED TOOLS AND METHODS

CROSS-REFERENCE TO RELATED APPLICATIONS

This application is a national phase entry under 35 U.S.C. § 371 of International Patent Application PCT/IB2021/052712, filed Mar. 31, 2021, designating the United States of America and published as International Patent Publication WO 2021/198964 A1 on Oct. 7, 2021, which claims the benefit under Article 8 of the Patent Cooperation Treaty to U.S. Patent Application Ser. No. 63/004,178, filed Apr. 2, 2020.

TECHNICAL FIELD

Embodiments of the disclosure relate to aircraft structures, in particular, to aircraft fuselage structure and surface characteristics and to related tools and apparatus.

BACKGROUND

Aircraft (e.g., airplanes, gliders, flying taxis, helicopters, jets, rockets, missiles, etc.) are used to transport people, animal, and other cargo large distances in relatively short amounts of time. Aircraft face challenges that are less common for automobiles due to their ability to travel in three dimensions rather than 2 dimensions and at much higher rates of speed. Some of the challenges faced by aircraft include forces induced by air, such as drag and lift.

Autonomous aircraft (e.g., drones) have many uses. Some drones are used to support the military, for example, drones are used for surveillance, cargo delivery, bombing, and close air support. Drones also have been used in non-military roles such as, delivering cargo and packages, aerial photography, geographic mapping, search and rescue, disaster management, agriculture management, wildlife monitoring, law enforcement surveillance, construction management, and storm tracking. Autonomous aircraft can be remotely controlled or preprogrammed to fly specific paths without human intervention following the preprogramming.

BRIEF SUMMARY

Some embodiments of the present disclosure may include an aircraft including a fuselage with one or more wings extending from the fuselage. The aircraft may include one or more apertures in a surface of at least one of the fuselage and the one or more wings. The one or more apertures may be configured to enable air to pass through the one or more apertures when the aircraft is flying.

Another embodiment of the present disclosure may include an aircraft including a fuselage. The fuselage may include a surface defining an internal cavity. The aircraft may include at least two apertures in the surface configured to enable airflow into the cavity through a first aperture and airflow out of the cavity through a second aperture. The aircraft may further include at least one wing extending from the substantially hollow fuselage.

Another embodiment of the present disclosure may include a method of designing an aircraft. The method may include determining critical flight attributes of the aircraft. The method may further include defining an initial aperture configuration in a skin of the aircraft. The method may also include modeling fluid flow around and through the aircraft. The method may further include calculating flight characteristics of the fluid flow around and through the aircraft. The method may also include changing an aperture configuration in the skin of the aircraft. The method may further include repeating modeling the fluid flow around and through the aircraft. The method may also include repeating calculating flight characteristics of the fluid flow around and through the aircraft.

BRIEF DESCRIPTION OF THE DRAWINGS

While the specification concludes with claims particularly pointing out and distinctly claiming embodiments of the present disclosure, the advantages of embodiments of the disclosure may be more readily ascertained from the following description of embodiments of the disclosure when read in conjunction with the accompanying drawings in which:

DETAILED DESCRIPTION

Figure 1:
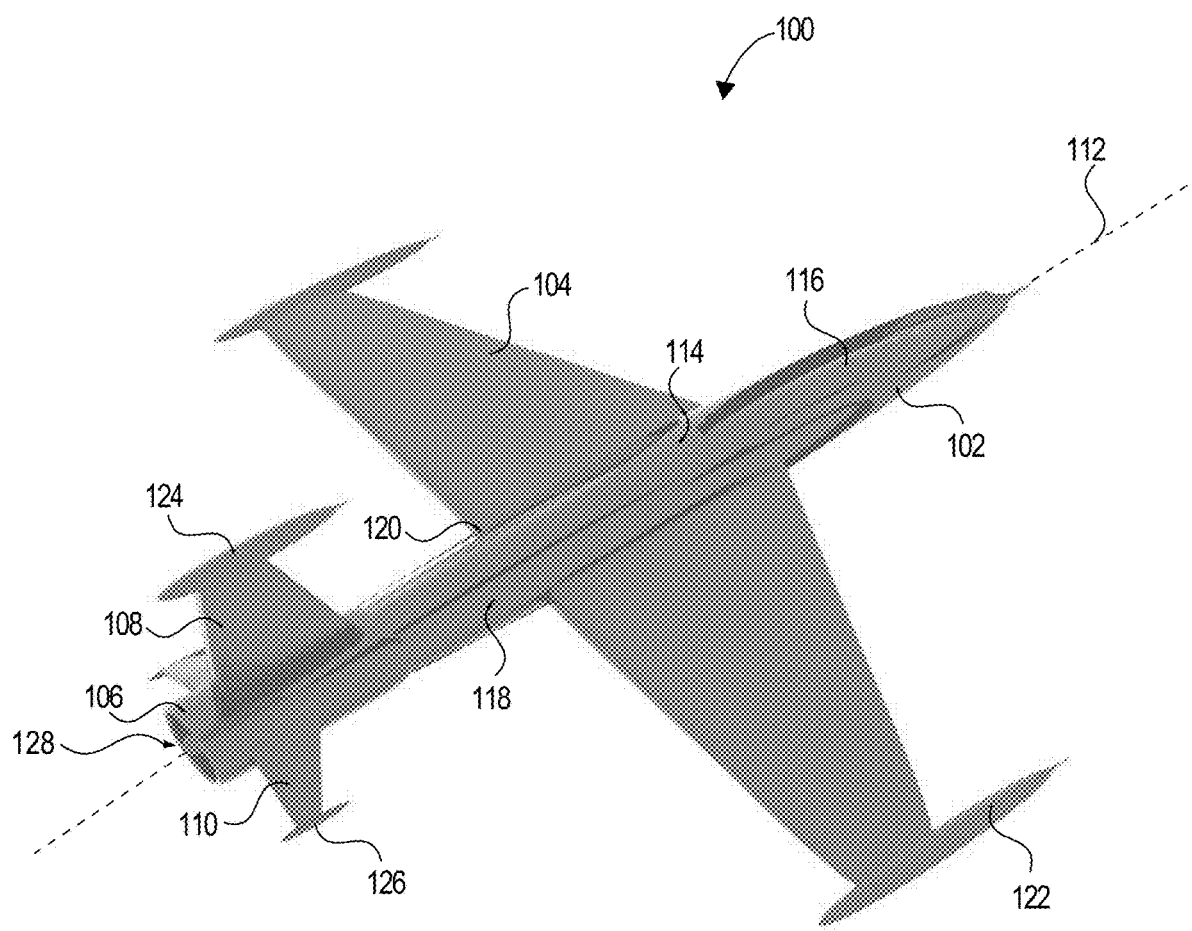
FIG. 1 illustrates an isometric view of an aircraft according to an embodiment of the present disclosure.
Figure 2:
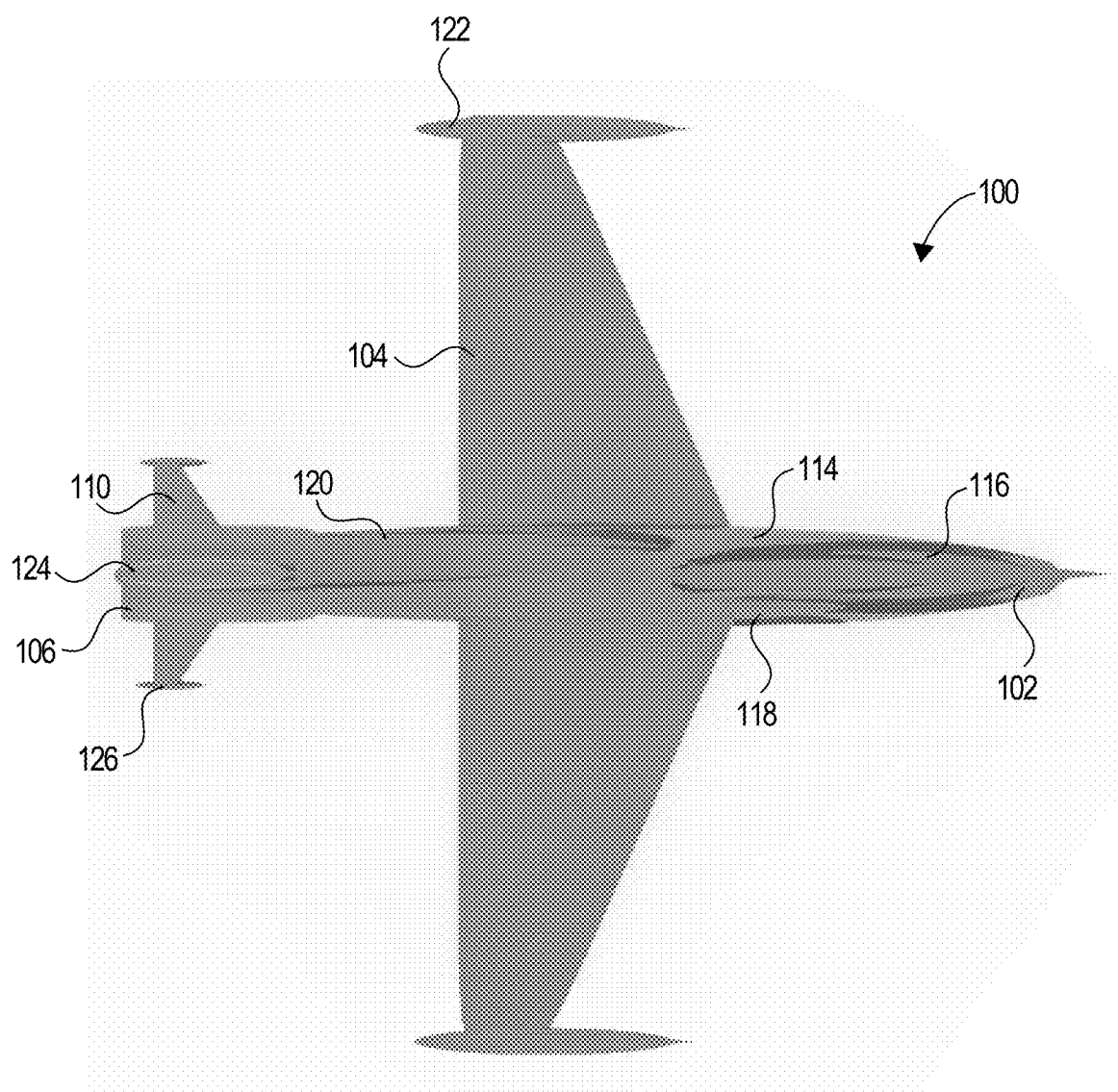
FIG. 2 illustrates a top view of an aircraft according to an embodiment of the present disclosure.
Figure 3:
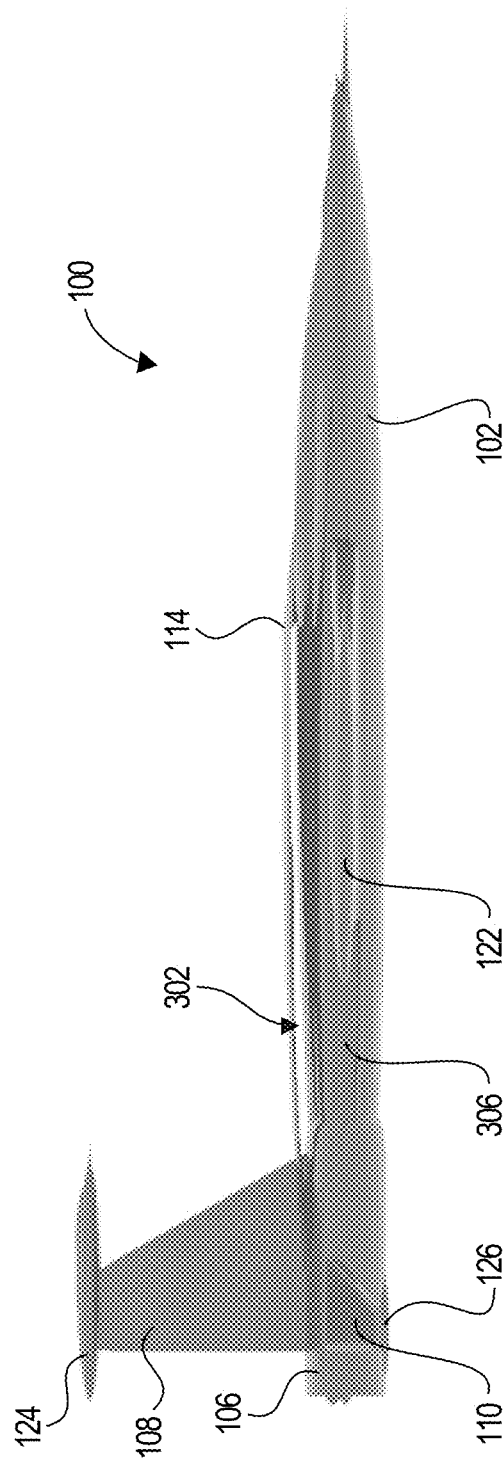
FIGS. 3 and 4 illustrate side views of an aircraft according to an embodiment of the present disclosure.
Figure 4:
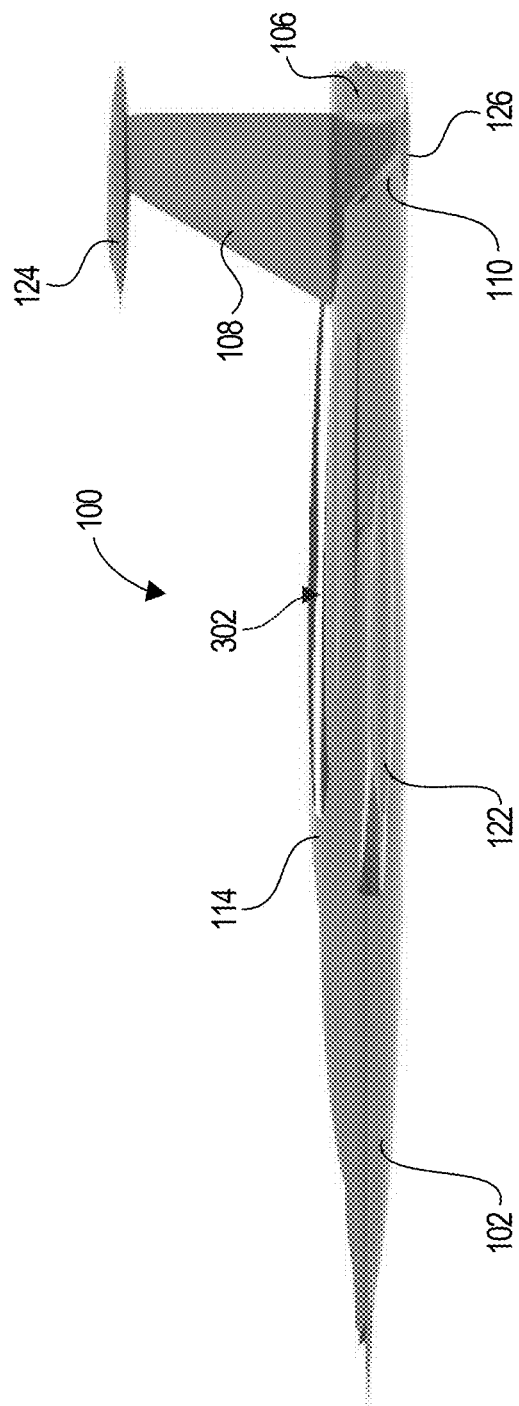
Figure 5:
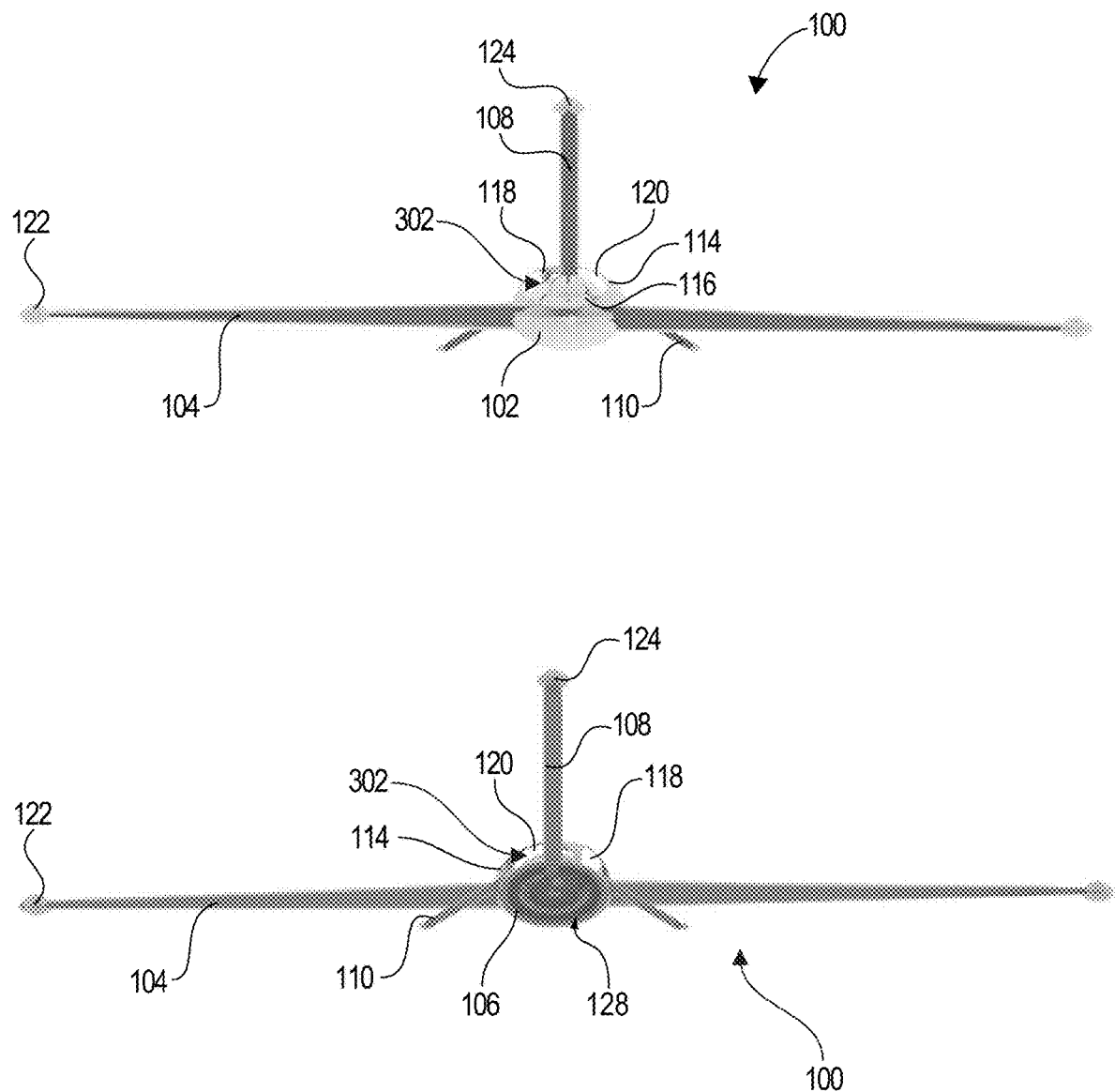
FIG. 5 illustrates front and rear views of an aircraft according to an embodiment of the present disclosure.
Figure 6:
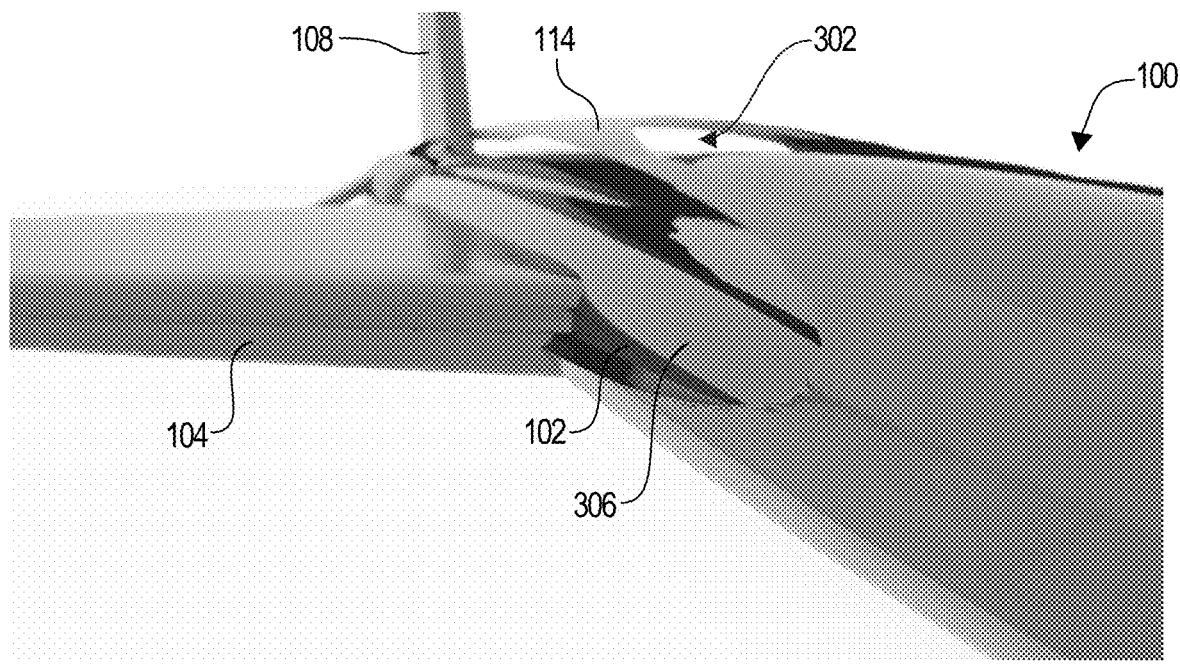
FIG. 6 illustrates enlarges isometric views of an aircraft according to an embodiment of the present disclosure.
Figure 6:
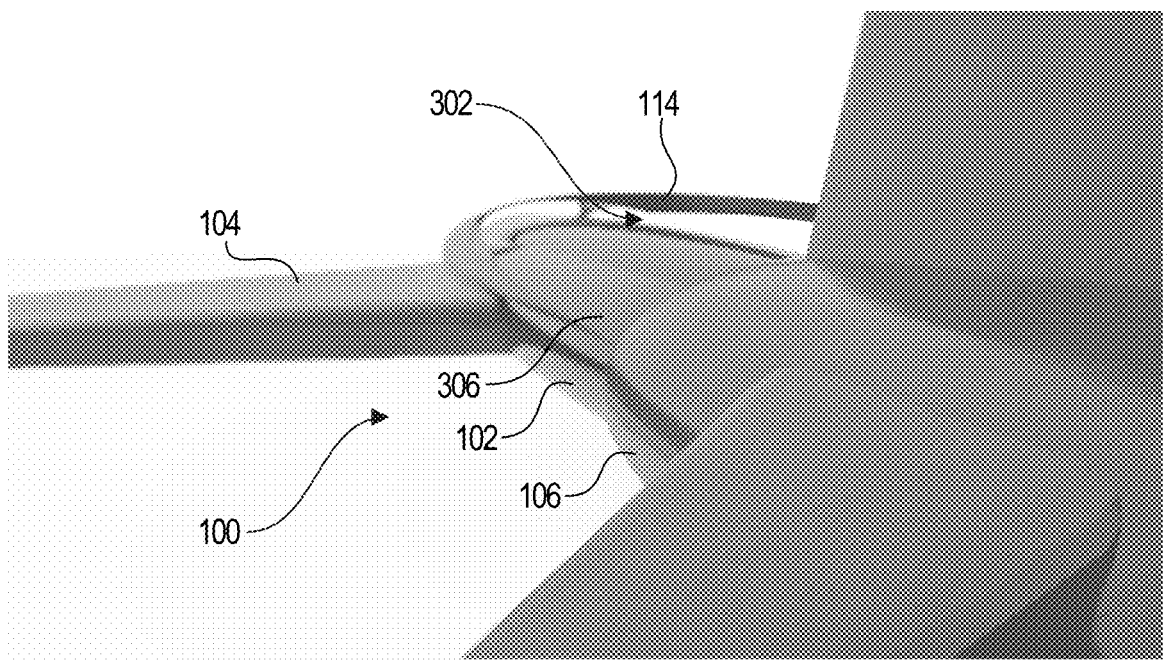

The illustrations presented herein are not meant to be actual views of any particular aircraft or component thereof, but are merely idealized representations employed to describe illustrative embodiments. The drawings are not necessarily to scale.

As used herein, the term "substantially" in reference to a given parameter means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, at least about 99% met, or even at least about 100% met.

As used herein, relational terms, such as "first," "second," "top," "bottom," etc., are generally used for clarity and convenience in understanding the disclosure and accompanying drawings and do not connote or depend on any specific preference, orientation, or order, except where the context clearly indicates otherwise.

As used herein, the term "and/or" means and includes any and all combinations of one or more of the associated listed items.

Due to their ability to travel in three dimensions rather than 2 dimensions and at much higher rates of speed aircrafts are greatly affected by forces induced by air, such as drag and lift. Optimizing the forces experienced by the aircraft may increase the efficiency of the aircraft. Increased efficiency may enable the aircraft to travel longer distances, travel at higher rates of speed, travel higher in elevation, etc. In some embodiments, the forces induced by air may be manipulated through a design of the aircraft to change a behavior of the aircraft. For example, an aircraft design may enable an aircraft to change direction quickly resulting in an agile aircraft. In some embodiments, an aircraft design may enable an aircraft to fly in a stable manner at a high rate of speed. In some embodiments, an aircraft design may enable an aircraft to fly for an extended amount of time with little to no propulsion, such that the aircraft may travel large distances with little to no fuel.

FIGS. 1-6 illustrate views of an embodiment of an aircraft 100. The aircraft 100 may include a fuselage 102 coupled to one or more wings 104. The aircraft 100 may also include a tail 106. The tail 106 may include a vertical stabilizer 108 and one or more horizontal stabilizers 110. The fuselage 102 may have an oblong shape extending along an axis 112.

The fuselage 102 may include an outer skin 114. The outer skin 114 may define a substantially hollow portion 302 of the fuselage 102. The outer skin 114 may include one or more apertures 116, 118, 120. In some embodiments, the one or more apertures 116, 118, 120 may enable airflow to enter the substantially hollow portion 302 of the fuselage 102 through the apertures 116, 118, and 120. In some embodiments, the one or more apertures 116, 118, 120 may enable airflow to exit the substantially hollow portion 302 of the fuselage 102 through the one or more apertures 116, 118, and 120. For example, airflow may enter through a forward aperture 116 and exit through one or more aft apertures 118, 120.

In some embodiments, the one or more aft apertures may include an exhaust aperture 128 configured to allow exhaust from an engine to exit from the fuselage 102 of the aircraft 100. For example, airflow may enter the outer skin 114 of the fuselage 102 through a forward aperture 116 and exit the outer skin 114 of the fuselage 102 through the exhaust aperture 128. In some embodiments, the exhaust aperture 128 may be the only aft aperture, such that all of the air flow that enters the outer skin 114 of the fuselage 102 exits through the exhaust aperture 128.

In some embodiments, the one or more apertures 116, 118, 120 may be arranged non-uniformly about the outer skin 114 of the fuselage 102. For example, the one or more apertures 116, 118, 120 may be different sizes and/or shapes. In some embodiments, the one or more apertures 116, 118, 120 may be arranged such that no one aperture 116, 118, 120 is aligned with any other aperture 116, 118, and 120. In some embodiments, the one or more apertures 116, 118, 120 may be similar shapes but have different sizes. In some embodiments, the one or more apertures 116, 118, 120 may be similar sizes and shapes with different orientations. For example, the one or more apertures 116, 118, 120 may be substantially circular in shape, such as circular, oval shaped, ellipsis, etc. The one or more substantially circular apertures 116, 118, 120 may be oriented such that axes (e.g., minor axis, major axis, etc.) are not aligned with an adjacent aperture 116, 118, 120.

In some embodiments, the one or more apertures 116, 118, 120 may be substantially uniform and arranged in a substantially uniform pattern about a portion of the outer skin 114 of the fuselage 102. For example, one or more apertures 116, 118, 120 may be arranged about a top portion of the front portion of the fuselage 102. In some embodiments, the apertures 116, 118, 120 may be multiple narrow slots axially arranged about the top portion of the front portion of the fuselage 102. In some embodiments, the narrow slots may enable multiple apertures 116, 118, 120 to be arrange adjacent to one another in the same portion of the fuselage 102. In some embodiments, the apertures 116, 118, 120 may be substantially the same size, shape, etc. In some embodiments, the apertures 116, 118, 120 may have substantially the same orientation in different positions. In some embodiments, the apertures 116, 118, 120 may be multiple small openings rather than the large apertures illustrated in FIGS. 1-6.

In some embodiments, the one or more apertures 116, 118, 120 may be arranged in the outer skin 114 of the fuselage 102 around the entire fuselage 102. In some embodiments, the one or more apertures 116, 118, 120 may only be arranged on a single side of the fuselage 102, such as the top of the fuselage 102, the bottom of the fuselage 102, front of the fuselage 102, etc.

In some embodiments, the fuselage 102 may include an inner structure 306. The inner structure 306 may be configured to house operational components, such as controls, engines, electronics, communication hardware, etc. In some embodiments, the inner structure 306 may be configured to house nonoperational components, such as passengers, cargo, etc., within the inner structure 306. For example, the inner structure 306 may be configured to perform the functions of a standard fuselage and the substantially hollow portion 302 of the fuselage 102 may be configured to enable airflow between the one or more apertures 116, 118, 120.

The aircraft 100 may be constructed from light weight material such as polymer materials or composite materials (e.g., carbon fiber, fiber glass, etc.). In some embodiments, structural components of the aircraft, such as the inner structure 306 may be constructed from different materials than the outer skin 114. For example, the inner structure 306 may be constructed from a composite material and the outer skin 114 may be formed from a polymer material.

The wings 104 may include a wing tip structure 122 at or near an end of the wing 104 opposite the fuselage 102. In some embodiments, the wing tip structure 122 may be configured to reduce drag on the wing, such as a winglet, raked wingtip, split tip, wingtip fence, etc. In some embodiments, the wing tip structure 122 may have a similar shape to the fuselage 102. For example, the wing tip structure 122 may be formed as a reduced size replica of the fuselage 102. For example, the wing tip structure 122 may have dimensions that are between about ⅒th and about ⅙th of the dimensions of the fuselage 102, such as approximately ⅛th the dimensions of the fuselage 102.

The wings 104 may be substantially free of apertures. For example, the fuselage 102 and/or the wing tip structures 122 may have multiple apertures. However, the wings 104 joining the fuselage 102 to the wing tip structures 122 may not have apertures defined in the respective surfaces. In some embodiments, the wings 104 may have apertures defined in the surfaces. For example, the wings 104 may have a reduced concentration of apertures, a similar concentration of apertures, or even a higher concentration of apertures from the fuselage 102. In some cases, the wings 104 may include apertures having different characteristics, such as different sizes, different shapes, etc., from the apertures 116, 118, 120 in the fuselage 102.

The vertical stabilizer 108 may include a vertical stabilizer structure 124 similar to the wing tip structure 122. In some embodiments, the vertical stabilizer structure 124 may have a similar shape to the fuselage 102. For example, the vertical stabilizer structure 124 may be formed as a reduced size replica of the fuselage 102. For example, the vertical stabilizer structure 124 may have dimensions that are between about 1/12th and about 1/8th of the dimensions of the fuselage 102, such as approximately 1/10th the dimensions of the fuselage 102.

The horizontal stabilizers 110 may include a horizontal stabilizer structure 126 similar to the wing tip structure 122 and the vertical stabilizer structure 124. In some embodiments, the horizontal stabilizer structure 126 may have a similar shape to the fuselage 102. For example, the horizontal stabilizer structure 126 may be formed as a reduced size replica of the fuselage 102. For example, the horizontal stabilizer structure 126 may have dimensions that are between about 1/20th and about 1/10th of the dimensions of the fuselage 102, such as approximately 1/16th the dimensions of the fuselage 102.

Figure 7:
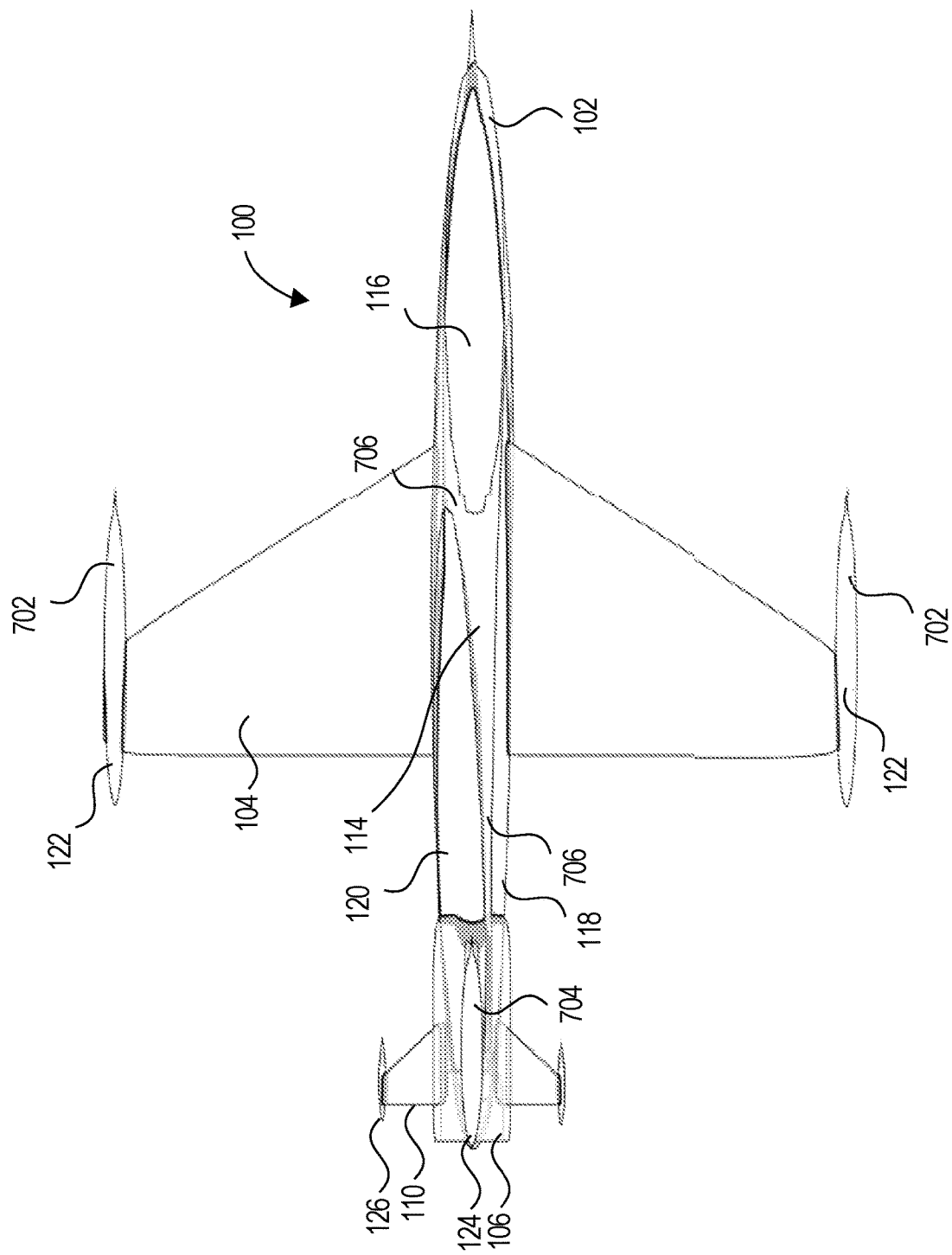
FIG. 7 illustrates a top view of an aircraft according to an embodiment of the present disclosure.

FIG. 7 illustrates a top view of the aircraft 100. The aircraft 100 may include multiple apertures 116, 118, 120 in the outer skin 114 of the fuselage 102. The apertures 116, 118, 120 may be non-uniform. For example, the apertures 116, 118, 120 may be arranged at different radial positions about the outer skin 114 of the fuselage 102. The apertures 116, 118, 120 may be defined by ribs 706 in the outer skin 114.

In some embodiments, the wing tip structures 122 may be substantially hollow. The wing tip structures 122 may include one or more apertures 702 in an outer skin of the wing tip structures 122. In some embodiments, the apertures 702 in the wing tip structures 122 may be non-uniform. For example, the apertures 702 may be arranged in similar positions to the apertures 116, 118, 120 in the outer skin 114 of the fuselage 102. In some embodiments, the apertures 702 may be arranged differently than the apertures 116, 118, 120 in the outer skin 114 of the fuselage 102. In some embodiments, the wing tip structure 122 may have fewer apertures 702 than the fuselage 102. In some embodiments, a size of the apertures 702 in the wing tip structures 122 may be proportionally related to the apertures 116, 118, 120 in the outer skin 114 of the fuselage 102. For example, if the wing tip structure 122 has dimensions that are about 1/8th the same dimensions of the fuselage 102, the apertures 702 in the wing tip structures 122 may be about 1/8th the size of the associated apertures 116, 118, 120. In some embodiments, the apertures 702 in the wing tip structure 122 may not be proportionally related to the apertures 116, 118, 120 in the outer skin 114 of the fuselage 102. For example, the apertures 702 may be similarly shaped and arranged about the wing tip structure 122 but larger or smaller in proportion to the dimensions of the wing tip structure 122 than the associated apertures 116, 118, 120.

In some embodiments, the vertical stabilizer structure 124 may be substantially hollow. The vertical stabilizer structure 124 may include one or more apertures 704 in an outer skin of the vertical stabilizer structure 124. In some embodiments, the apertures 704 in the vertical stabilizer structure 124 may be non-uniform. For example, the apertures 704 may be arranged in similar positions to the apertures 116, 118, 120 in the outer skin 114 of the fuselage 102. In some embodiments, the apertures 704 may be arranged differently than the apertures 116, 118, 120 in the outer skin 114 of the fuselage 102. In some embodiments, the wing tip structure 122 may have fewer apertures 704 than the fuselage 102. In some embodiments, a size of the apertures 704 in the vertical stabilizer structure 124 may be proportionally related to the apertures 116, 118, 120 in the outer skin 114 of the fuselage 102. For example, if the vertical stabilizer structure 124 has dimensions that are about 1/10th the same dimensions of the fuselage 102, the apertures 704 in the vertical stabilizer structure 124 may be about 1/10th the size of the associated apertures 116, 118, 120. In some embodiments, the apertures 704 in the vertical stabilizer structure 124 may not be proportionally related to the apertures 116, 118, 120 in the outer skin 114 of the fuselage 102. For example, the apertures 704 may be similarly shaped and arranged about the vertical stabilizer structure 124 but larger or smaller in proportion to the dimensions of the vertical stabilizer structure 124 than the associated apertures 116, 118, 120.

Figure 8:
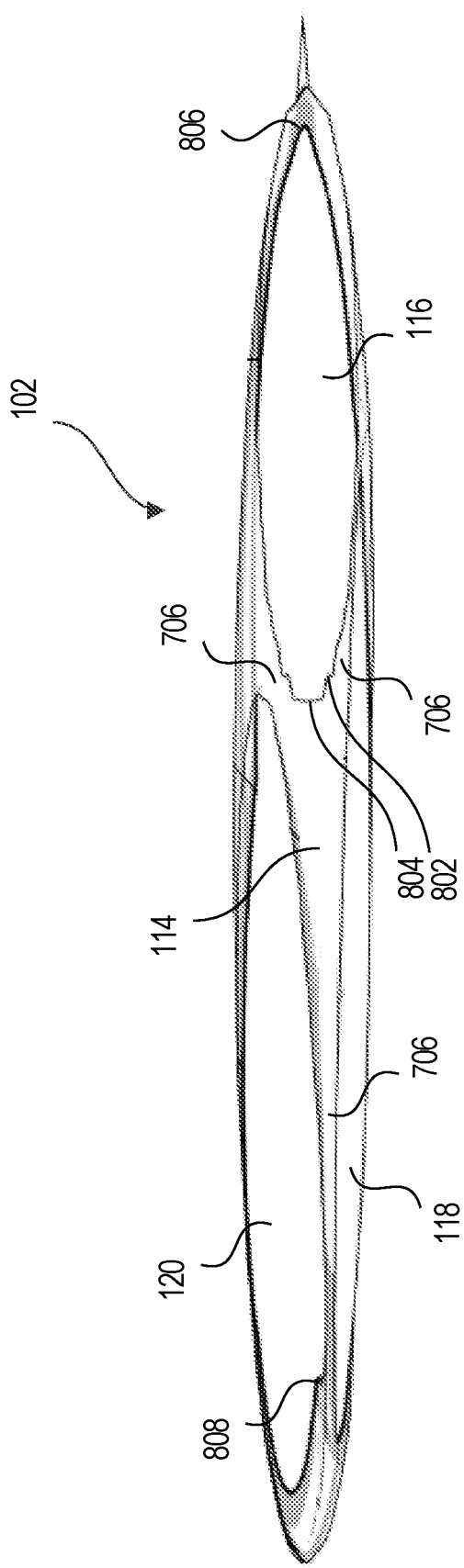
FIG. 8 illustrates a top view of a fuselage of the aircraft of FIGS. 1-7 according to an embodiment of the present disclosure.

FIG. 8 illustrates a top view of the fuselage 102 of the aircraft 100. The outer skin 114 of the fuselage 102 may include ribs 706 that may define apertures 116, 118, 120 in the outer skin 114 of the fuselage 102. As illustrated in FIG. 8, the apertures 116, 118, 120 may be non-uniform. For example, the apertures 116, 118, 120 may be different sizes, shapes, etc. In some embodiments, the apertures 116, 118, 120 may be arranged in different radial and/or longitudinal positions about the fuselage 102. In some embodiments, the apertures 116, 118, 120 may be formed from multiple small apertures.

As illustrated in FIG. 8, a first aperture 116 may be in a forward most position on the fuselage 102. The first aperture 116 may be substantially centered on the top of the fuselage 102. A second aperture 118 may be both longitudinally and radially offset from the first aperture 116. In some embodiments, the second aperture 118 may have a different shape from the first aperture 116. For example, the second aperture 118 may be larger than the first aperture 116. In some embodiments, the second aperture 118 may have a major axis that is larger than the major axis of the first aperture 116 such that the second aperture 118 is longer than the first aperture 116.

In some embodiments, the first aperture 116 may have a different shape from the second aperture 118 and/or a third aperture 120. For example, the first aperture 116 may have a substantially elliptical nose portion 806 and a rear portion of the first aperture 116 may include one or more ridges 802 and a flat portion 804 in the rib 706 defining the first aperture 116. The second aperture 118 may have a substantially elliptical shape. The third aperture 120 may be substantially elliptical in shape with at least one ridge 808 in the rib 706 defining the third aperture 120. In some embodiments, the second aperture 118 and/or the third aperture 120 may include one or more ridges and/or flat portions in the associated ribs 706 defining the respective second aperture 118 and third aperture 120. For example, the second aperture 118 and the third aperture 120 may have flat portions and ridges positioned in different respective positions from those in the first aperture 116.

In some embodiments, each of the apertures 116, 118, 120 may have substantially the same size and shape, with only a position of the apertures 116, 118, 120 being different. The different positions, sizes, and shapes of the apertures 116, 118, 120 may have different effects on the drag and lift forces on the aircraft 100.

Figure 9:
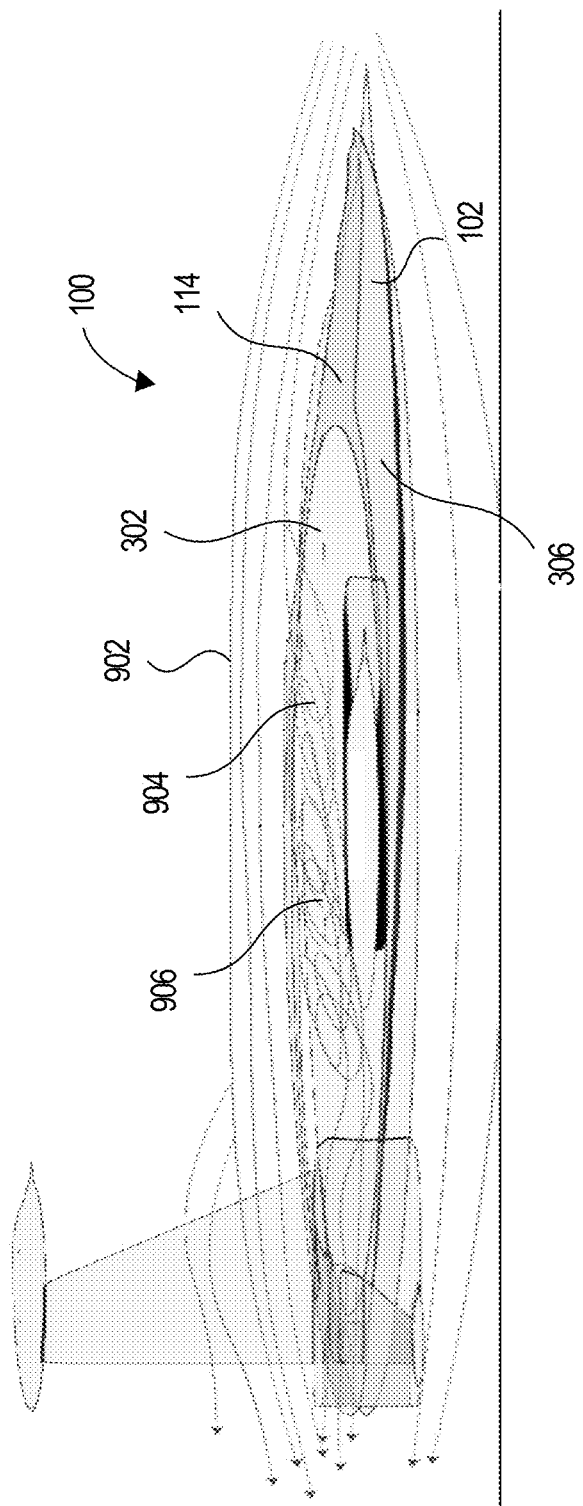
FIG. 9 illustrates a side view of a fluid flow model of the aircraft of FIGS. 1-8 according to an embodiment of the present disclosure.
Figure 10:
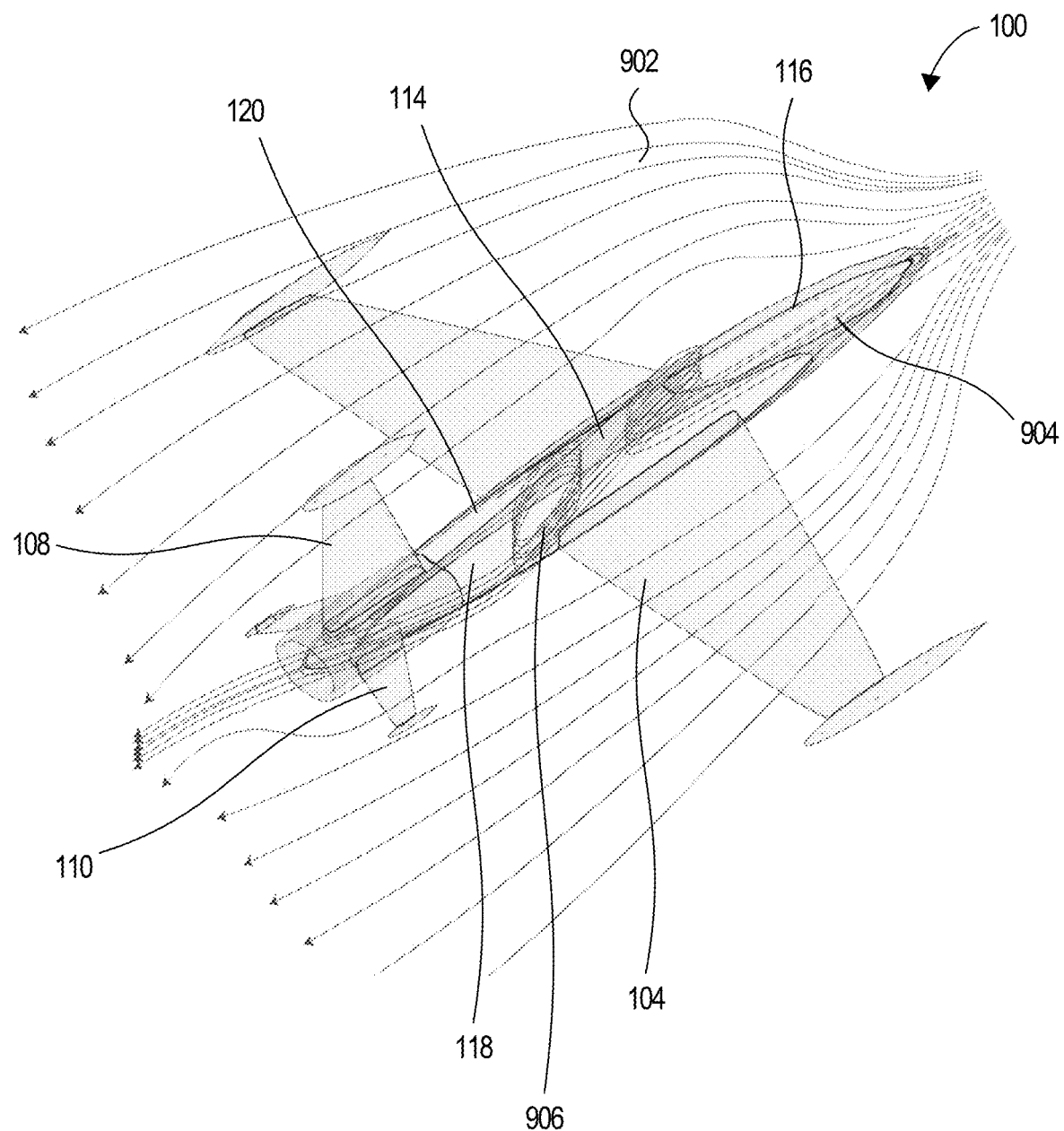
FIG. 10 illustrates an isometric view of a fluid flow model of the aircraft of FIGS. 1-8 according to an embodiment of the present disclosure.

FIGS. 9 and 10 illustrate a flow model of the aircraft 100. During flight air may flow around the aircraft 100. The airflow may be separated into exterior flow 902 and interior flow 904. The exterior flow 902 may flow over exterior surfaces of the aircraft 100, such as exterior surfaces of the outer skin 114 of the fuselage 102, exterior surfaces of the wings 104, exterior surfaces of the vertical stabilizer 108, and exterior surfaces of the horizontal stabilizers 110. The interior flow 904 may flow through the substantially hollow portion 302 of the fuselage 102. For example, the interior flow 904 may enter the substantially hollow portion 302 through the apertures 116, 118, 120, and exit the substantially hollow portion 302 through the apertures 116, 118, 120.

The apertures 116, 118, 120 may be configured to create vortices in the interior flow 904. The vortices may generate internal forces on the aircraft 100, such as lift or drag. In some embodiments, the vortices 906 may reduce drag on the aircraft 100. In some embodiments, the vortices 906 may increase lift on the aircraft 100. In some embodiments, the vortices may reduce stability of the 100 enabling the aircraft to make abrupt changes in direction. In some embodiments, the vortices 906 may increase stability of the aircraft 100 enabling the aircraft 100 to fly at higher rates of speed and/or fly more efficiently.

The size, shape, and/or location of the apertures 116, 118, 120 may determine what types of vortices 906 are created in the interior flow 904. For example, a first configuration of the apertures 116, 118, 120 may cause vortices in the interior flow 904 that may increase lift and stability in the aircraft 100. A second configuration of the apertures 116, 118, 120 may cause vortices 906 in the interior flow 904 that may increase lift and reduce stability in the aircraft 100. A third configuration of the apertures 116, 118, 120 may cause vortices 906 in the interior flow 904 that may increase lift and reduce drag in the aircraft 100.

The exterior flow 902 may remain substantially laminar (e.g., substantially free of turbulence). The laminar flow may reduce drag on the outer surfaces of the aircraft 100. Maintaining laminar flow over the outer surfaces of the aircraft 100 may increase efficiency of the aircraft 100 by up to fifty percent. A fifty percent increase in efficiency may increase a range of the aircraft 100 up to double the range. The size, shape, and/or location of the apertures 116, 118, 120 may control the exterior flow 902. For example, the arrangement, shape, and size of the apertures 116, 118, 120 may define air speeds where laminar flow may be maintained. The aircraft 100 may then be controlled to fly at the defined air speeds. Controlling the aircraft 100 in this way may be defined as laminar flow control. The apertures 116, 118, 120 may increase the laminar flow control speeds thereby increasing the efficiency of the aircraft 100 at higher speeds.

Figure 11:
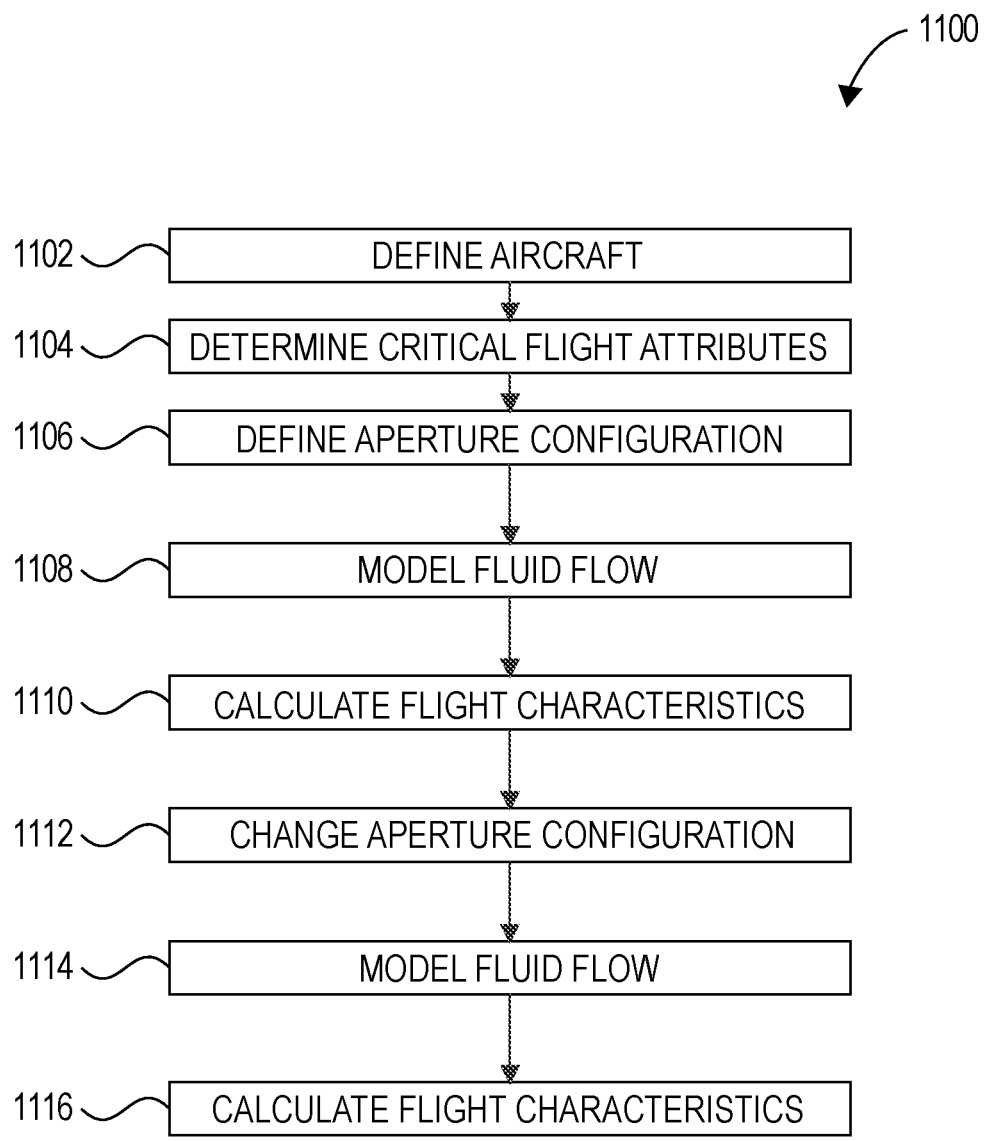
FIG. 11 illustrates a flow diagram of a method of designing an aircraft according to an embodiment of the present disclosure.

FIG. 11 illustrates a method of designing an aircraft 1100. Reference is also made to FIGS. 1-10. The type of aircraft being designed is determined in act 1102. For example, an aircraft designed to carry cargo long distances has certain design considerations that may be different from an aircraft designed for close air support or air to air combat. Other types of aircraft such as gliders, surveillance aircraft, rockets, missiles, etc., also have different considerations. Once the type of aircraft being designed is determined in act 1102, the critical flight attributes are determined in act 1104. For example, improving efficiency through increased lift and reduced drag may be critical attributes for a surveillance aircraft, whereas decreasing stability and increasing lift may be critical attributes for a close air support aircraft or air to air combat aircraft.

Initial aperture configurations may be defined in act 1106. For example, an initial aperture configuration may be defined where the apertures 116, 118, 120 are known to improve at least one of the critical attributes identified in act 1104. The aperture configuration may include size, shape, and location of each aperture 116, 118, 120. In some embodiments, the aperture configuration may include other properties such as a thickness of the outer skin 114 of the fuselage 102, a size of the substantially hollow portion 302 of the fuselage 102, whether similar apertures 702 are included in the wing tip structures 122 or apertures 704 are included in the vertical stabilizer structure 124, etc.

An iterative fluid flow model such as a computational fluid dynamics (CFD) model may be used to model fluid flow (e.g., airflow) around and through the aircraft 100 in act 1108. The fluid flow model may model the effects of the aperture configuration on both the exterior flow 902 and the interior flow 904 including vortices 906 formed in the fluid flow. The fluid flow model may enable flight characteristics, such as lift, drag, stability, agility, speed, thrust, etc., to be calculated in act 1110.

Once the flight characteristics are calculated in act 1110, the aperture configuration may be adjusted in act 1112. For example, a size of one or more of the apertures 116, 118, 120 may be adjusted. In some cases, a location of one or more of the apertures 116, 118, 120 may be adjusted. In some cases, a shape of one or more of the apertures 116, 118, 120 may be adjusted. In some cases, if the critical attributes are close to the desired values, the adjustment to the aperture configuration may be relatively small. In other cases, where the critical attributes are not close to the desired values, the adjustments may be larger. For example, the adjustment may include a change to more than one of the characteristics of the apertures 116, 118, 120, such as both a shape and location adjustment.

After the aperture configuration is adjusted in act 1112, the fluid flow model may be used to model fluid flow around the aircraft 100 with the adjusted aperture configuration in act 1114. The fluid flow model may enable flight characteristics, such as lift, drag, stability, agility, speed, thrust, etc., to be calculated in act 1116. The process may be repeated until the critical attributes are met or exceeded by the fluid flow model calculations.

Non-limiting embodiments of the present disclosure may include:

Embodiment 1: An aircraft comprising: a fuselage; one or more wings extending from the fuselage; one or more apertures in a surface of at least one of the fuselage and the one or more wings; wherein the one or more apertures are configured to enable air to pass through the one or more apertures when the aircraft is flying.

Embodiment 2: The aircraft of embodiment 1, wherein the one or more apertures comprise at least two apertures.

Embodiment 3: The aircraft of embodiment 2, wherein a first aperture and a second aperture of the at least two apertures are non-uniform.

Embodiment 4: The aircraft of embodiment 3, wherein the first aperture has a first shape and the second aperture has a second shape and the first shape is different from the second shape.

Embodiment 5: The aircraft of any one of embodiments 3 or 4, wherein the first aperture has a first size and the second aperture has a second size larger than the first size.

Embodiment 6: The aircraft of any one of embodiments 2 through 5, wherein a first aperture is positioned in a forward portion of the aircraft and a second aperture is positioned in a rear portion of the aircraft.

Embodiment 7: The aircraft of embodiment 6, wherein the first aperture is positioned in a central portion of the aircraft and the second aperture is positioned on a side of the aircraft.

Embodiment 8: The aircraft of any one of embodiments 1 through 7, wherein the one or more wings are substantially free of apertures.

Embodiment 9: An aircraft comprising: a substantially hollow fuselage comprising a surface defining an internal cavity; at least two apertures in the surface configured to enable airflow into the cavity through a first aperture and airflow out of the cavity through a second aperture; and at least one wing extending from the substantially hollow fuselage.

Embodiment 10: The aircraft of embodiment 9, wherein the at least two apertures define an opening having a circular shape.

Embodiment 11: The aircraft of embodiment 10, wherein the circular shape is substantially an oval shape.

Embodiment 12: The aircraft of any one of embodiments 9-11, wherein the at least one wing is substantially free of apertures.

Embodiment 13: A method of designing an aircraft comprising: determining flight attributes of the aircraft; defining an initial aperture configuration in a skin of the aircraft; modeling fluid flow around and through the aircraft; calculating flight characteristics of the fluid flow around and through the aircraft; changing an aperture configuration in the skin of the aircraft; repeating modeling the fluid flow around and through the aircraft; and repeating calculating flight characteristics of the fluid flow around and through the aircraft.

Embodiment 14: The method of embodiment 13, wherein the aperture configuration comprises a size, a shape, and a location of at least one aperture in the skin of the aircraft.

Embodiment 15: The method of any one of embodiments 13 or 14, wherein changing the aperture configuration comprises adjusting one or more of a location, a size, and a shape of at least one aperture in the skin of the aircraft.

Embodiment 16: The method of any one of embodiments 13 through 15, wherein defining flight attributes of the aircraft comprises defining a laminar flow control speed.

Embodiment 17: An aircraft wing comprising: a wingtip structure coupled to the wing, the wingtip structure comprising: a shell defining a substantially hollow structure; one or more apertures through the shell configured to enable airflow into the substantially hollow structure through the one or more apertures.

Embodiment 18: The aircraft wing of embodiment 17, further comprising a wing surface substantially free of apertures.

Embodiment 19: The aircraft wing of any one of embodiments 17 or 18, further comprising a wing surface comprising one or more apertures, wherein the one or more apertures in the wing surface have at least one different characteristic from the one or more apertures through the shell.

Embodiment 20: The aircraft wing of embodiment 19, wherein the at least one different characteristic is selected from the group comprising concentration, size, and shape.

An aircraft according the embodiments of the present disclosure may operate with increased lift, efficiency, stability, and/or agility. Increases to these flight characteristic may enable an aircraft to better accomplish its mission. For example, an aircraft traveling large distances may benefit from increased efficiency enabling the aircraft to travel larger distances using less fuel. Increasing lift of an aircraft may increase the cargo capacity of the aircraft. Increasing the agility of an aircraft may enable the aircraft to better navigate difficult obstacles or evade attacks.

The embodiments of the disclosure described above and illustrated in the accompanying drawings do not limit the scope of the disclosure, which is encompassed by the scope of the accompanying claims and their legal equivalents. Any equivalent embodiments are within the scope of this disclosure. Indeed, various modifications of the disclosure, in addition to those shown and described herein, such as alternative useful combinations of the elements described, will become apparent to those skilled in the art from the description. Such modifications and embodiments also fall within the scope of the accompanying claims and equivalents.

What is claimed is:

1. An aircraft comprising:
   a fuselage including an inner structure configured to house operational components and an empty cavity separate from the inner structure, the empty cavity extending from a front of the fuselage to a rear of the fuselage;
   one or more wings extending from the fuselage;
   an outer skin defining the empty cavity of the fuselage; and
   one or more apertures comprising at least a first aperture and a second aperture in the outer skin of the fuselage;
   wherein the one or more apertures are configured to enable air to pass through the empty cavity of the fuselage by passing through the one or more apertures when the aircraft is flying; and
   wherein the first aperture is positioned in an upper central portion of the aircraft and the second aperture is positioned on a side of the aircraft.

2. The aircraft of claim 1, wherein the one or more wings are substantially free of apertures.

3. The aircraft of claim 1, wherein a first aperture is positioned in a forward portion of the aircraft and a second aperture is positioned in a rear portion of the aircraft.

4. The aircraft of claim 1, wherein a first aperture and a second aperture of the at least two apertures are non-uniform.

5. The aircraft of claim 4, wherein the first aperture has a first shape and the second aperture has a second shape and the first shape is different from the second shape.

6. The aircraft of claim 4, wherein the first aperture has a first size and the second aperture has a second size larger than the first size.

7. An aircraft comprising:
   a substantially hollow fuselage comprising an inner structure configured to house operational components, a hollow portion extending from a front of the substantially hollow fuselage to a rear of the substantially hollow fuselage, and a surface defining an internal cavity of the hollow portion;
   at least two apertures comprising at least a first aperture and a second aperture in the surface configured to enable airflow into the cavity through the first aperture and airflow out of the cavity through the second aperture, wherein each of the apertures are longitudinally and radially offset from adjacent apertures, where the first aperture is positioned in a forward portion of the aircraft and the second aperture is positioned in a rearward portion of the aircraft; and
   at least one wing extending from the substantially hollow fuselage.

8. The aircraft of claim 7, wherein the at least one wing is substantially free of apertures.

9. The aircraft of claim 7, wherein the at least two apertures define an opening having a circular shape.

10. The aircraft of claim 9, wherein the circular shape is substantially an oval shape.

11. A method of designing the aircraft of claim 1 comprising:
    determining flight attributes of the aircraft;

defining an initial aperture configuration in a skin of the aircraft, wherein the skin defines an empty cavity within the aircraft separate from operational components of the aircraft;

modeling fluid flow around and through the empty cavity of the aircraft;

calculating flight characteristics of the fluid flow around and through the empty cavity of the aircraft;

changing an aperture configuration in the skin of the aircraft;

repeating modeling the fluid flow around and through the empty cavity of the aircraft; and repeating calculating flight characteristics of the fluid flow around and through the empty cavity of the aircraft.

12. The method of claim 11, wherein the aperture configuration comprises a size, a shape, and a location of at least one aperture in the skin of the aircraft.

13. The method of claim 11, wherein changing the aperture configuration comprises adjusting one or more of a location, a size, and a shape of at least one aperture in the skin of the aircraft.

14. The method of claim 11, wherein defining flight attributes of the aircraft comprises defining a laminar flow control speed.

15. An aircraft wing comprising:
a wingtip structure coupled to the wing, the wingtip structure comprising:
a shell defining a substantially hollow structure; and
at least two apertures through the shell, the at least two apertures including a forward aperture proximate a front portion of the wingtip structure and a rear aperture proximate a rear portion of the wingtip structure, the at least two apertures having a substantially elliptical shape defined longitudinally along the shell of the wingtip structure and configured to enable airflow into the substantially hollow structure through the forward aperture and out of the substantially hollow structure through the rear aperture; and
a wing surface comprising one or more additional apertures, wherein the one or more additional apertures in the wing surface have at least one different characteristic from the one or more apertures through the shell.

16. The aircraft wing of claim 15, wherein the at least one different characteristic is selected from the group comprising concentration, size, and shape.

* * * * *